United States Patent Office 3,113,148
Patented Dec. 3, 1963

3,113,148
PREPARATION OF METHYLENE BIS(MONOCAR-BOXY-SUBSTITUTED ARYL) COMPOUNDS
John R. Le Blanc, Dayton, Ohio, and James G. Murray, Scotia, N.Y., assignors to Monsanto Chemical Company, St. Louis, Mo., a corporation of Delaware
No Drawing. Filed Aug. 31, 1960, Ser. No. 53,058
6 Claims. (Cl. 260—515)

This invention relates to a series of difunctional diarylmethane type compounds. More particularly this invention is directed at an improved process for preparing methylenebis(monocarboxy-substituted aryl) compounds from "less reactive" types of substituted aromatic compounds, i.e., aromatic acids.

The common prior art procedure for preparing methylenebis(monocarboxy-substituted aryl) compounds of the benzene series having from 6 to 9 carbon atoms in the aryl radical, consisted of adding benzoic acid or a derivative thereof and formaldehyde to a strong sulfuric acid solution and heating the mixture at 50–55° C. until the condensation reaction to form the respective bis-acid compound was completed, according to the following general equation

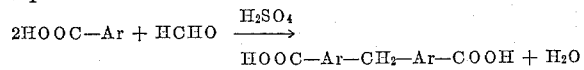

wherein Ar is the aryl radical of the benzene series having from 6 to 9 carbon atoms in the starting material which is converted to the corresponding bivalent arylene radical in the bis-acid product, and then recovering the desired bis-acid product from the unreacted materials and sulfuric acid, according to conventional methods. However, according to that procedure, the percent conversion to product was always relatively low. In addition to poor conversion, this procedure had the disadvantage of being subject to competing sulfonation and oxidation reactions which were undesired. As a result, the yield of product was inherently lowered.

It has now been discovered according to this invention, that methylenebis(monocarboxy-substituted aryl) compounds of this type can be prepared in the absence of competing sulfonation and oxidation reactions, with increased conversions and higher yields if the reaction between the monocarboxy-substituted aryl compound and the source of formaldehyde is conducted in the presence of a complex catalyst system comprising a liquid phosphoric acid solution having dissolved therein a substantial amount of an acidic halide selected from the group consisting of boron trihalide, aluminum trihalide, ferric trihalide, stannic halides, and zinc halides. It is believed that the phosphoric acid and the acidic halide form a chemical compound or complex which contributes to the catalytic activity of this system to the condensation reaction involved in this process. However, whether a chemical compound or complex is formed, or whether there is present a physical mixture is of no consequence since it has been found that this combination performs as desired. It is preferred to have the phosphoric acid solution saturated with the acidic halide material. Also, it is preferred that the phosphoric acid solution used be of a strong concentration on the order of from 70–90% by weight, to effect a rapid, economical reaction and to conserve reaction volume space, although acid concentrations on the order of from 50% to 100% by weight may also be used.

Monocarboxy-substituted aryl compounds useful for the purpose of preparing the desired products according to the method of this invention are, e.g., benzoic acid, toluic acid, 2,4,6-trimethylbenzoic acid, 4-ethylbenzoic acid, 2-isopropylbenzoic acid, 2,3-dimethylbenzoic acid, and similar compounds having non-reacting halogen substituents, a few examples of which are: 2-chlorobenzoic acid, 4-bromo-2-toluic acid, 3-fluorobenzoic acid, 3-iodobenzoic acid.

While formaldehyde itself may be used in the method of this invention, other sources of formaldehyde, such as methylal, dimethoxymethane, and the commonly used polymerized forms of formaldehyde such as trioxane, paraformaldehyde, polyoxymethylene, may also be used. Hence, when the term "formaldehyde" is used in this specification, such term is intended to include the use of these other formaldehyde sources.

The catalytic condensing agents used in the process of this invention comprise a combination of phosphoric acid and an acidic halide selected from the group consisting of a boron trihalide, aluminum trihalide, ferric trihalide, stannic halide and a zinc halide. Although any halide, of this given class may be used, certain halides such as boron trifluoride, aluminum chloride, ferric chloride, stannic chloride, and zinc chloride are preferred for reasons of ready availability and favorable cost.

The combination of the phosphoric acid and one or more of these acidic halide materials is a solvent system which functions as a good condensation catalyst for the reaction between the monocarboxy-substituted aryl compound and the formaldehyde reactant. Advantageously, therefore, the solvent-catalyst system is employed in amounts sufficient to dissolve reactants or at least effectively contact them in the reaction mixture. Quantities on the order of from 1 to 10 volumes of the solvent-catalyst system to 1 volume of reactant are generally used. Larger volumes of the solvent-catalyst system may be used but might be economically unfeasible. When the reaction is completed, the solvent-catalyst system may be separated from the product, concentrated and recycled with unreacted starting materials and be re-used in the process.

The present process is usually conducted by reacting the monocarboxy-substituted aryl compound and the formaldehyde in the phosphoric acid-acidic halide solvent-catalyst complex at a temperature of about 25° C. to about 150° C., preferably at from 55° C. to 75° C. until reaction is completed. Lower temperatures may be used but the reaction proceeds too slowly at such temperatures. Higher temperatures make control of the reaction difficult. Often the reaction mixture is heated within the given temperature range for from 1 to 10 hours to insure complete reaction. For optimum yields, it is desirable to add the (monocarboxy-substituted aryl) compound and the formaldehyde to the prepared catalyst system complex, that is, to the previously prepared phosphoric acid solution of the acidic halide. Alternatively, the catalyst system may be added to the mixture of the monocarboxy-substituted aryl compound and formaldehyde.

The monocarboxy-substituted aryl compound and formaldehyde reactants may be combined in any desired proportions, an excess of either reactant being useful. Normally, however, an excess of the formaldehyde reactant is usually used since it is the cheaper of the two reactants and because an excess thereof, together with the catalyst system used in the method of this invention, aid the promotion of the reaction.

When the condensation reaction between the monocarboxy-substituted aryl compound and the formaldehyde reactant is completed, the resulting methylenebis(monocarboxy-substituted aryl) product may be recovered according to conventional practices. Such practice may for example, comprise steps similar to the following used in the experiments of this invention: the whole reaction mixture was poured into ice water, stirred, and filtered, to obtain as a precipitate, a crude mixture of the bis-acid product and some unreacted starting acids, which mixture was extracted with an ether or benzene solvent to effect further purification, the solvent was evaporated off, leaving the bis-acid product and some unreacted starting acid, When the free bis-acid product is the desired product it may be desired to extract the crude product in hot water, leaving the purified bis-acid as unreacted residue. Alternatively, the mixture of the bis-acid product and any unreacted starting acid may be esterified by dissolving the mixture in the appropriate alcohol, acidifying the solution, and warming the acidified mixture until the esterification reaction is completed, neutralizing the solution, and then fractionating the esters to effect separation of the ester of the respective bis-acid and starting material. Esterification recovery techniques such as that described above, are useful when the esters are to be used as rubber and plasticizer additives. For example, the alkyl esters, for example, the dibutyl and the di-2-ethylhexyl esters of methylenebis(benzoic acid) are useful as plasticizers.

The invention is further illustrated by, but is not intended to be limited to, the following specific examples.

*Example 1*

This example illustrates the commonly used prior art procedure for preparing methylenebis(monocarboxy-substituted aryl) compounds, using sulfuric acid as the solvent-condensing agent.

To a reaction vessel containing 300 ml. of concentrated sulfuric acid, there was added 122 g. (1.0 mole) of benzoic acid and 7.9 g. (0.25 mole) of 95% paraformaldehyde. The mixture was heated until an exothermic reaction began at 50° C., and then heated at 50-55° C. for 2.5 hours to insure complete reaction. After cooling the reaction mixture to room temperature, it was poured into ice water. The resulting precipitate was filtered off and dried overnight at 50-60° C. in a vacuum oven. The dried mixed acid precipitate was dissolved in methanol, and the resulting solution was saturated with hydrogen chloride gas. When the esterification reaction was completed, the solution was neutralized with sodium carbonate solution and filtered. The filtrate was distilled to remove methanol and fractionated to obtain 31 g. (44% conversion based on the formaldehyde reactant) of the dimethyl ester of methylenebis(benzoic acid), B.P. 200-213° C./0.2 mm.

*Example 2*

This example compares the procedure of this invention with that of the commonly used prior art procedure of Example 1 to show comparative advantages.

The reaction of Example 1 was repeated except that in place of the sulfuric acid there was used 173 g. of 85%, by weight, phosphoric acid, saturated with 192 g. of boron trifluoride at 40-45° C. Benzoic acid, 122 g. (1.0 mole) and 7.9 g. of 95% paraformaldehyde (0.25 mole) were heated in the presence of the above phosphoric acid-boron trifluoride catalyst condensing agent until reaction began at 75° C., and then heated at 75-80° C. as in the prior example to insure complete reaction. The reaction mixture was cooled, and poured into ice water, washed and filtered as above. The precipitate was dried and dissolved in methanol and saturated with hydrogen chloride gas to effect esterification. Upon fractionation, there was obtained 47 g. (71% conversion based on the formaldehyde reactant) of the dimethyl ester of methylenebis-(benzoic acid).

*Example 3*

This example illustrates the conduct of the invention wherein phosphoric acid-boron trifluoride solvent-catalyst system is used as a condensing agent using formaldehyde in excess amounts.

A solution of 86.5 g. of an 85% by weight phosphoric acid saturated with 85 g. boron trifluoride at 45-50° C. was split into two portions. One portion, 35 ml., of this solution was treated with 5.1 g. (0.161 mole, 29% excess) of 95% paraformaldehyde; and to the other fraction, comprising the rest of the solution, there was added 30.5 g. (0.25 mole) of benzoic acid. The benzoic acid portion was heated to 60° C. and then the formaldehyde treated portion was added to the benzoic acid portion at 60-66° C. over about a ½ hour period. An exothermic reaction took place turning the color of the mixture to a brown. The mixture was heated with stirring at 72-80° C. for 5 and ½ hours to insure complete reaction. The reaction mixture was poured into ice water, washed and filtered as in the prior examples and then extracted with hot water in a Soxhlet extractor for 16 hours to remove unreacted benzoic acid. The undissolved residue comprising the crude product was dried in a vacuum oven at 75° C. for 6 hours and consisted of 23.5 g. of methylene-bis(benzoic acid), M.P. 212-230° C. for a 74.5% conversion based on the benzoic acid used.

*Example 4*

This example illustrates the process of the invention wherein stoichiometric amounts of benzoic acid and formaldehyde reactant were used.

To 173 g. (1.5 moles) of 85% phosphoric acid solution, saturated with 202.5 g. (2.98 moles) of boron trifluoride, there was added 61 g. (0.5 mole) of benzoic acid and then 7.9 g. (0.25 mole) of 95% paraformaldehyde cautiously at 25-27° C. The reaction mixture was heated slowly to 50° C., during which time reaction took place, and the mixture was heated at 50-55° C. for 4 hours and then cooled to room temperature, poured into ice, stirred for 15 minutes, and allowed to stand overnight. The precipitate was filtered off and purified by extracting it with ether to obtain 25 g. of insoluble methylenebis(benzoic acid). The remaining ether soluble crude bis(benzoic acid) was dissolved in methanol, saturated with hydrogen chloride gas as in the previous example and then fractionated to obtain the dimethyl ester of methylenebis(benzoic acid) in a 53% conversion based on the benzoic acid reactant.

*Example 5*

The procedure of Example 4 was repeated except that in place of benzoic acid there was used o-toluic acid (79 g., 0.5 mole). The reaction between the o-toluic acid and the 95% paraformaldehyde became exothermic at 40-45° C. The reaction mixture was stirred at 42-49° C. for 6 hours to insure complete reaction and then poured into ice water and worked up in the usual manner to give 20 g. of methylenebis(o-toluic acid), M.P. 230-237° C.

*Example 6*

In a mixture of 85% phosphoric acid and 60 g. of zinc chloride, there was reacted 15.5 g. of benzoic acid and 2 g. of 95% paraformaldehyde at a temperature of from 90-110° C. over a period of about 3 hours. The reaction mixture was poured into ice, and filtered. The precipitate was extracted with ether and filtered to obtain 4 g. of solid melting at 250-256° C. which was methylenebis(benzoic acid) for a 51.7% conversion based on the benzoic acid reactant.

A method for the preparation of methylenebis(monocarboxy-substituted aryl) compounds has been described which permits the preparation of the products in better yields and without the danger of competing sulfonation and oxidation reactions. While the invention has been described with particular reference to various preferred embodiments thereof, it will be understood that numerous modifications and variations are possible without departing from the invention.

We claim:

1. The process which comprises reacting a monocarboxy-substituted aryl compound of the benzene series having from 6 to 9 carbon atoms with formaldehyde, in the presence of a catalytic condensing agent consisting essentially of phosphoric acid and a member of the group consisting of a boron trihalide and a zinc halide, at a temperature of from 25° C. to 150° C., and recovering a compound of the formula

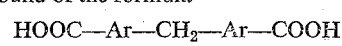

wherein Ar is the arylene radical derived from the monocarboxy-substituted aryl starting material.

2. The process which comprises reacting benzoic acid with formaldehyde in the presence of a catalytic condensing agent consisting essentially of phosphoric acid and a member of the group consisting essentially of a boron trihalide and a zinc halide at a temperature of from 25° C. to 150° C., and recovering methylenebis(benzoic acid).

3. The process which comprises reacting o-toluic acid with formaldehyde in the presence of a catalytic condensing agent consisting essentially of phosphoric acid and a member of the group consisting of a boron trihalide and a zinc halide at a temperature of from 25° C. to 150° C., and recovering methylenebis(o-toluic acid).

4. The process which comprises reacting benzoic acid with formaldehyde in the presence of a catalytic condensing agent consisting essentially of phosphoric acid and boron trifluoride at a temperature of from 55° C. to 75° C., and recovering methylenebis(benzoic acid).

5. The process which comprises reacting benzoic acid with formaldehyde in the presence of a catalytic condensing agent consisting essentially of phosphoric acid and zinc chloride, at a temperature of from 90° C. to 110° C., and recovering methylenebis(benzoic acid).

6. The process which comprises reacting o-toluic acid with formaldehyde in the presence of a catalytic condensing agent consisting essentially of phosphoric acid and boron trifluoride at a temperature of from 25° C. to 150° C. and recovering methylenebis(o-toluic acid).

References Cited in the file of this patent

Schopff, "Berichte," vol. 27, II, May-July 1894, pp. 2321–2326.

Booth et al., "Boron Trifluoride and Its Derivatives," John Wiley & Sons, 1949, pp. 167–169.

Walker, "Formaldehyde," A.C.S. Monograph No. 120, 2nd ed., 1953, pp. 239–240, 273, 342–343.

Royals, "Advanced Org. Chem.," Prentice-Hall Inc., 1956, pp. 504–505.